United States Patent
Pavlik, Jr.

(10) Patent No.: US 6,802,269 B2
(45) Date of Patent: Oct. 12, 2004

(54) ALUMINA REFRACTORIES AND METHODS OF TREATMENT

(75) Inventor: Robert S. Pavlik, Jr., Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/438,562

(22) Filed: May 14, 2003

(65) Prior Publication Data

US 2003/0192460 A1 Oct. 16, 2003

Related U.S. Application Data

(63) Continuation of application No. 10/016,838, filed on Dec. 13, 2001, now abandoned.

(51) Int. Cl.[7] ................................................. F23B 7/00
(52) U.S. Cl. ....................................... 110/341; 110/338
(58) Field of Search ................................ 110/338, 341; 264/674; 501/127, 89, 100, 105, 120, 125, 153; 106/38.27; 65/374.13

(56) References Cited

U.S. PATENT DOCUMENTS

| | | | |
|---|---|---|---|
| 3,132,953 A | 5/1964 | Alper et al. | 106/57 |
| 3,519,448 A | 7/1970 | Alper et al. | 106/57 |
| 3,758,328 A | 9/1973 | Kirchner et al. | 117/107.2 |
| 3,994,739 A | 11/1976 | Casidy et al. | 106/65 |
| 4,056,588 A | 11/1977 | Baniel et al. | 264/63 |
| 4,348,236 A | 9/1982 | Hines et al. | 106/38.27 |
| 4,459,156 A | 7/1984 | Henslee et al. | 106/85 |
| 4,489,138 A | 12/1984 | Yamatsuta et al. | 428/614 |
| 4,505,887 A | 3/1985 | Miyata et al. | 423/635 |
| 4,600,442 A * | 7/1986 | Pastor et al. | 134/2 |
| 5,278,111 A | 1/1994 | Frame | 501/155 |
| 6,306,788 B1 | 10/2001 | Watanabe et al. | 501/153 |

* cited by examiner

Primary Examiner—Kenneth B. Rinehart
(74) Attorney, Agent, or Firm—Timothy M Schaeberle

(57) ABSTRACT

Methods for improving the strength of alumina refractory materials are disclosed. The method involves exposing the alumina material to a halogen gas. The treated materials can be used in furnaces for producing fused silica optical members.

16 Claims, 1 Drawing Sheet

ALUMINA REFRACTORIES AND METHODS OF TREATMENT

This is a Continuation of U.S. Ser. No. 10/016,838, filed Dec. 13, 2001, now abandoned, entitled Alumina Refractories and Methods Of Treatment, of Robert S. Pavlik, Jr.

FIELD OF THE INVENTION

This invention relates to alumina refractories and methods for treating alumina refractories. More particularly, the invention relates to methods of improving the strength of alumina refractories and refractories having improved strength.

BACKGROUND OF THE INVENTION

Zircon ($ZrSiO_4$) and zirconia ($ZrO_2$) are recognized as highly refractory materials. Accordingly, shaped bodies of such materials, such as brick, are frequently employed in conjunction with high temperature processes. Zircon is more frequently used because of its stability, ease of fabrication and lower cost.

Alumina is another known refractory material, and alumina is used in a variety of refractory applications, for example, in furnaces. Furnaces that are used in the manufacture of fused silica optical members, however, typically utilize zircon refractory materials. FIG. 1 shows a furnace 100 for producing fused silica glass. The furnace includes a crown 12 and a plurality of burners 14 projecting from the crown. As noted above, silica particles are generated in a flame when a silicon containing raw material together with a natural gas are passed through the plurality of burners 14 into the furnace chamber 26. These particles are deposited on a hot collection surface of a rotating body where they consolidate to the solid, glass state. The rotating body is in the form of a refractory cup or containment vessel 15 having lateral walls 17 and a collection surface 21 which surround the boule 19 and provide insulation to the glass as it builds up. The refractory insulation ensures that the cup interior and the crown are kept at high temperatures.

A standard fused silica furnace further includes a ring wall 50 which supports the crown 12. The furnace further includes a rotatable base 18 mounted on an oscillation table 20. The base is rotatable about an axis 3. The crown 12, the ring wall 3, the base 18 and the lateral walls are all made from suitable refractory materials, typically zircon refractory materials. Zircon refractories used in fused silica furnace must contain low levels of metallic impurities, and one way of reducing the levels of impurities is through a carbochlorination process, which is described in U.S. Pat. No. 6,174,509.

Although the process for treating zircon refractories described in U.S. Pat. No. 6,174,509 produces refractories that have a substantially lower levels of metallic impurities than untreated zircon refractories, there continues to be a need for refractory materials that introduce even lower levels of impurities to materials produced in the furnace. In addition, any improvement in the mechanical or thermal properties of a refractory material is of interest in not only fused silica furnaces, but for other uses as well. A refractory material having improved strength would find use in a wide variety of applications.

SUMMARY OF INVENTION

One embodiment of the invention relates to methods for improving the strength of alumina refractory materials.

According to one embodiment of the invention, a method for improving the strength of alumina refractory materials is provided which includes the step of exposing the alumina refractory material to a halogen gas. In another embodiment, the step of exposing the alumina refractory to a halogen gas is performed at a temperature above about 1000° C. In another embodiment, the temperature during the step of exposing the alumina refractory is performed at a temperature between about 1000° C. and 1400° C. In still another embodiment, the step of exposing the alumina refractory is performed in the presence of a reducing agent, such as carbon black or graphite.

According to still another embodiment, the halogen gas is selected from the group consisting of fluorine, iodine, and chlorine. In another embodiment, the halogen gas includes a mixture of chlorine and a carrier gas, such as, for example helium, nitrogen, hydrogen or argon. Another embodiment involves exposing the refractory material to a halogen gas for at least one hour and less than 10 hours. According to one embodiment of the invention, the four point bend strength of the alumina refractory material is improved by at least 50% by the exposure to the halogen gas.

The alumina refractories produced according the methods of the present invention may be used in a wide variety of applications. For example, according to one embodiment, a furnace for the production of fused silica optical members is provided that includes an alumina refractory material processed according to methods of the present invention.

Additional features and advantages of the invention will be set forth in the following detailed description. It is to be understood that both the foregoing general description and the following detailed description are exemplary and are intended to provide further explanation of the invention as claimed.

DETAILED DESCRIPTION

Figure 1:
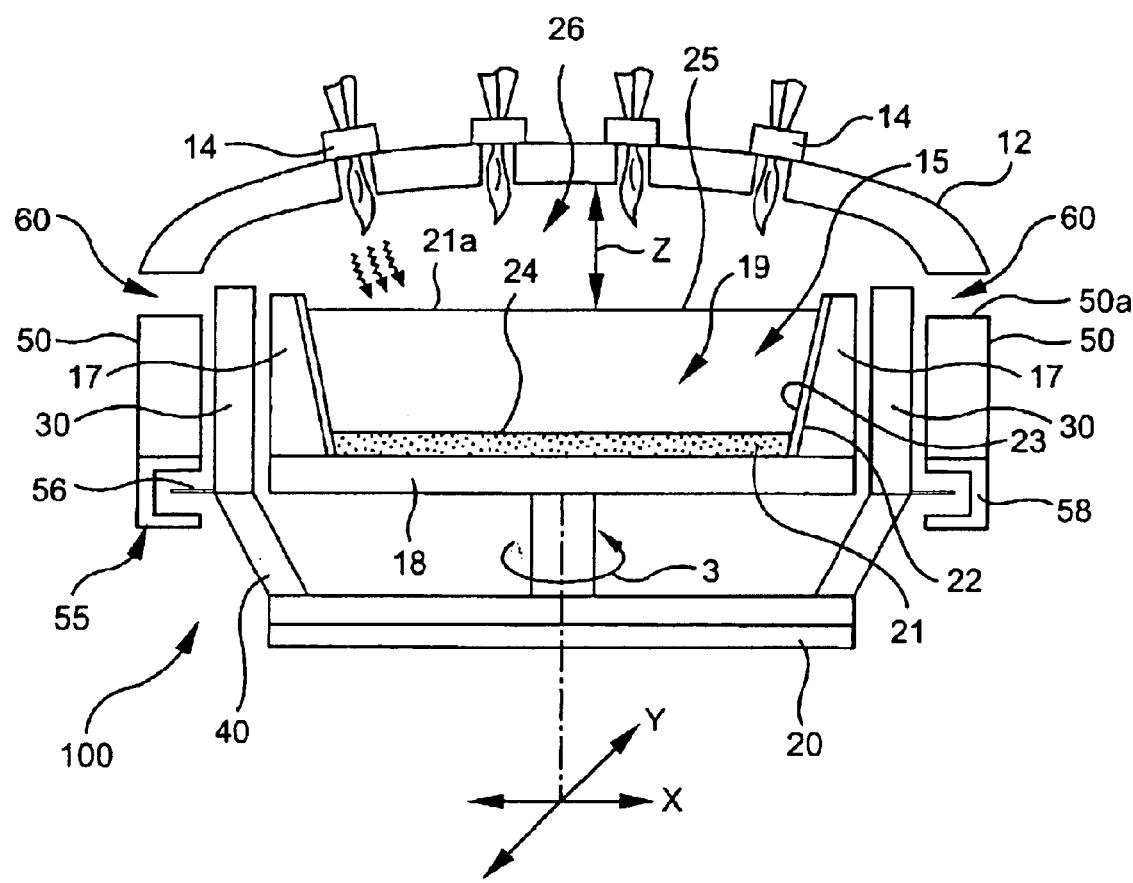
FIG. 1 is a schematic drawing illustrating a fused silica production furnace.

One embodiment of present invention relates to methods of treating alumina refractory materials. In one embodiment, treatment of alumina refractory materials with a halogen gas substantially improves the strength of the materials, and in some embodiments, by at least 50% when compared with untreated materials. Another embodiment of the invention relates to use of alumina refractory materials in fused silica production furnaces.

Alumina is of interest in high temperature applications because it can be used in temperatures up to about 1980° C. in air and up to about 1925° C. in reducing conditions. The ability to withstand these temperatures makes alumina a particularly attractive material for used in fused silica furnaces. Alumina also has a high melting point of about 2000° C. It is a single component oxide system that does not dissociate. Alumina refractory materials containing 99% or higher alumina content typically contain less than 2000 parts per million silica and generate less silica-related volatilization when used in furnaces.

Alumina refractory bricks containing greater than 99% alumina are typically fired at a temperature of about 1650° C. prior to being installed in a furnace. The theoretical density of alumina is 3.98 $g/cm^3$. In comparison to zircon, which has a theoretical density of 4.6 $g/cm^3$, an alumina refractory brick that is the same size and having the same porosity as a zircon refractory brick is lighter than a zircon refractory brick. In addition, alumina is harder than zircon, which should result in a lower potential for imparting solid inclusions into a furnace utilizing alumina refractories when compared to a furnace using zircon refractories. Alumina also has excellent creep resistance compared to zircon.

In the course of experimentation with alumina refractory bricks, applicants surprisingly discovered that treating alumina refractory bricks with a halogen gas significantly increased the strength of the bricks. In one embodiment, the treatment process is performed in the presence of a reducing agent, for example, a carbon-containing material such as graphite or carbon black. This halogen treatment process in the presence of a reducing agent involves the heating the refractory brick in the presence of a halogen gas, such as chlorine, to remove metallic impurities from the material. The reducing agent may include a carbon-containing material, such as a carbon black or graphite material lining in the furnace in which the process is performed.

Halogen gases such as chlorine, fluorine or iodine, alone or in acid gas form, can be used according to the present invention. The halogen gas can be used in essentially pure form. However, as little as 5% of a halogen gas mixed with an inert gas such as helium, argon, or nitrogen, with a longer treatment time, is also effective. The treatment may employ a continuous flow of the halogen gas. Alternatively, a pulsed type treatment may be used wherein gas is repeatedly introduced into the firing chamber and subsequently exhausted.

The cleansing action can occur at a temperature as low as about 900° C. However, it is usually preferred to employ somewhat higher temperatures in the range of about 1000 to 1400° C. The halogen treatment process on a refractory body may be carried out either prior to assembly into a furnace or after assembly. The treatment may also be carried out during production of the refractory. Alumina refractories are sintered in air at temperatures in excess of 1650° C. As the sintered furnace components are being cooled, the cooling step can be interrupted at an appropriate temperature, for example, 1250° C. The sintering furnace can then switched to a halogen-containing atmosphere, and the temperature maintained for the necessary time to increase the strength of the alumina refractory to the desired level. The treatment time may be as short as 45 minutes and may be as long as ten hours. The optimal treatment time may be determined by experimentation, and will depend on, among other factors, the composition of the starting material, the purity of the starting material, the desired strength of the treated material.

Without intending to limit the invention in any manner, the present invention will be more fully described by the following example.

EXAMPLE

Zircon and alumina refractory bricks were exposed to 6% chlorine gas mixed with helium gas in a vacuum furnace. The furnace was lined with a graphite lining, which acted as a reducing agent. The strength of the zircon and alumina refractory bricks was compared to samples of bricks made from the same material, but were not exposed to the halogen gas treatment to determine the increase in strength as a result of the halogen gas treatment. The alumina refractory brick contained more than 98% alumina. Strength was tested using a four point bend test, and strength was tested at room temperature and 1400° C.

TABLE 1

| Sample | Temperature | Average Strength (psi) | Standard Dev. |
|---|---|---|---|
| Zircon | Room | 1728 | 261 |
| Treated Zircon | Room | 1288 | 455 |
| Zircon | 1400° C. | 496 | 135 |
| Treated Zircon | 1400° C. | 643 | 4.7 |
| Alumina | Room | 1806 | 12.5 |
| Treated Alumina | Room | 3445 | 317 |
| Alumina | 1400° C. | 451 | 3 |
| Treated Alumina | 1400° C. | 2322 | 131 |

As can be seen from the results above, treatment of the zircon samples with a halogen gas only moderately affected the strength of the material. Surprisingly, however, treatment of the alumina samples resulted in a significant increase in the strength of the material. The treated alumina sample was almost 100% stronger at room temperature than the untreated alumina sample. The strength of the treated alumina refractory at 1400° C. was nearly five times greater than the untreated alumina refractory.

Treatment of alumina refractories in accordance with the method of the present invention also removed metallic impurities from the refractory material. In a typical sample, prior to treatment, as received alumina bricks contained 70 parts per million (ppm) K, 270 ppm Na, and 200 ppm Fe. After two treatments in halogen gas, the treated bricks contained 20 ppm K, 98 ppm Na and 140 ppm Fe.

Refractories treated in accordance with the invention provide several advantages. The strengthened refractories, which also contain lowered impurities, provide a cleaner furnace atmosphere. The use of strengthened refractories produced in accordance with the present invention in fused silica production furnaces enables the production of a fused silica product of high purity. Higher purity fused silica glasses are less prone to increases in radiation damage and fluorescence in service. These desired ends are achieved without requiring change in, or compromise of, either the furnace design or the silica forming and deposition process.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A method of improving the strength of an alumina refractory material comprising exposing the alumina refractory material to a halogen gas by flowing the halogen gas into a furnace containing the refractory material in the presence of a reducing agent at a temperature between 1000° C. and 1400° C., wherein the exposure to the halogen gas reduces metallic impurities in the material.

2. The method of claim 1, wherein the halogen gas is selected from the group consisting of fluorine, iodine, and chlorine.

3. The method of claim 2, wherein the gas includes chlorine.

4. The method of claim 3, wherein the gas includes a mixture of chlorine and a carrier gas.

5. The method of claim 4, wherein the carrier gas includes helium.

6. The method of claim 1, wherein the exposing step takes place for at least one hour and less than 10 hours.

7. The method of claim 1, wherein the reducing agent is a carbon-containing material.

8. The method of claim 1, wherein the four point bend strength of the material is improved by at least 50% by the exposure to the halogen gas.

9. A furnace for the production of fused silica optical members including an alumina refractory material treated in accordance with the method of claim 1.

10. A method of improving the strength of an alumina refractory material comprising exposing the refractory material to chlorine gas at a temperature exceeding 1000° C. and for a time exceeding one hour, wherein the exposure improves the four point bend strength of the material by at least 50%.

11. The method of claim 10, wherein the step of exposing the refractory material to chlorine gas is performed in the presence of a carbon-containing material.

12. A furnace for the production of fused silica optical members including a refractory treated in accordance with claim 11.

13. A method of improving the strength of an alumina refractory material alumina refractory material comprising the step of exposing the alumina refractory material to a halogen gas, wherein the exposing step improves the four point bend strength of the material by at least 50%.

14. The method of claim 13, wherein the halogen gas includes chlorine.

15. The method of claim 13, wherein the exposing step takes place for at least one hour and less than 10 hours.

16. A furnace for the production of fused silica optical members including an alumina refractory material treated in accordance with the method of claim 13.

* * * * *